(12) United States Patent
Danko et al.

(10) Patent No.: US 11,608,756 B2
(45) Date of Patent: Mar. 21, 2023

(54) SERVICE APPARATUS FOR USE WITH ROTARY MACHINES

(71) Applicant: General Electric Company, Schenectady, NY (US)

(72) Inventors: Todd William Danko, Niskayuna, NY (US); Ramvineeth Nitta, Orlando, FL (US); Kori Unhee Macdonald, Colonie, NY (US); Yakov Polishchuk, Niskayuna, NY (US); Robert Edward Huth, Greenville, SC (US); Don Mark Lipkin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 417 days.

(21) Appl. No.: 16/037,397

(22) Filed: Jul. 17, 2018

(65) Prior Publication Data

US 2020/0025039 A1    Jan. 23, 2020

(51) Int. Cl.
*F01D 25/28* (2006.01)
*B23P 6/00* (2006.01)
*B64F 5/60* (2017.01)
*B64F 5/40* (2017.01)

(52) U.S. Cl.
CPC ............ *F01D 25/285* (2013.01); *B23P 6/002* (2013.01); *B64F 5/40* (2017.01); *B64F 5/60* (2017.01); *F05D 2220/32* (2013.01); *F05D 2230/72* (2013.01); *F05D 2240/90* (2013.01)

(58) Field of Classification Search
CPC ........... F01D 25/285; B23P 6/002; B64F 5/60
See application file for complete search history.

(56) References Cited

U.S. PATENT DOCUMENTS

| 5,164,826 | A | 11/1992 | Dailey |
| 6,049,978 | A | 4/2000 | Arnold |
| 6,414,458 | B1 | 7/2002 | Hatley et al. |
| 7,766,726 | B2 * | 8/2010 | Sherlock ................. F01D 5/005 |
| | | | 451/121 |
| 8,602,722 | B2 | 12/2013 | George et al. |
| 9,618,424 | B2 | 4/2017 | Deascanis et al. |

(Continued)

OTHER PUBLICATIONS

Jae Hun You et al., Numerical investigations of Fenestron™ noise characteristics using a hybrid method, CEAS Aeronaut J 7, 185-207, Published Jan. 16, 2016 (Year: 2016).*

(Continued)

*Primary Examiner* — Moshe Wilensky
*Assistant Examiner* — Kyle A Cook
(74) *Attorney, Agent, or Firm* — Fitch, Even, Tabin & Flannery LLP

(57) ABSTRACT

A service apparatus for use in maintaining a machine including a stator and a rotor is provided. The service apparatus includes a carriage assembly configured to couple to the rotor. The service apparatus is selectively transitionable between a stowed position in which the service apparatus is rotatable with the rotor and an extended position in which the service apparatus is extended toward the stator. The service apparatus also includes at least one maintenance device coupled to the carriage assembly. The at least one maintenance device is operable to perform a maintenance operation on a surface of the stator with the service apparatus in the extended position.

20 Claims, 6 Drawing Sheets

(56) References Cited

U.S. PATENT DOCUMENTS

| | | | |
|---|---|---|---|
| 9,719,774 B2 | 8/2017 | Ullrich et al. | |
| 2005/0126291 A1* | 6/2005 | Czerw | G01N 29/28 |
| | | | 73/589 |
| 2008/0245151 A1* | 10/2008 | Roney | G01N 29/44 |
| | | | 73/628 |
| 2008/0250860 A1* | 10/2008 | Clossen-von Lanken Schulz | G01N 29/46 |
| | | | 73/627 |
| 2009/0172934 A1* | 7/2009 | Mall | H02K 15/165 |
| | | | 29/402.01 |
| 2011/0178727 A1* | 7/2011 | Hafenrichter | B64F 5/60 |
| | | | 702/38 |
| 2013/0232792 A1* | 9/2013 | Quinones | F01D 5/005 |
| | | | 29/889.1 |
| 2014/0067185 A1 | 3/2014 | Tralshawala et al. | |
| 2014/0179200 A1* | 6/2014 | Clark | B24B 23/08 |
| | | | 451/28 |
| 2016/0069829 A1* | 3/2016 | Ruhge | G01N 25/72 |
| | | | 374/4 |
| 2016/0195390 A1* | 7/2016 | Nissen | B25J 9/1676 |
| | | | 901/44 |
| 2017/0225804 A1* | 8/2017 | Hafenrichter | B25J 11/00 |
| 2017/0234132 A1* | 8/2017 | Roberts | B21D 3/16 |
| | | | 29/889.1 |
| 2018/0003060 A1* | 1/2018 | Lipkin | B23P 6/045 |
| 2018/0100396 A1* | 4/2018 | Lipkin | H04N 5/44 |
| 2018/0142560 A1* | 5/2018 | Wojtowicz | F01D 5/3007 |
| 2018/0154490 A1 | 6/2018 | Lipkin | |
| 2018/0223667 A1 | 8/2018 | Danko | |
| 2020/0102850 A1 | 4/2020 | Lipkin | |
| 2020/0180084 A1 | 6/2020 | Lipkin | |

OTHER PUBLICATIONS

Uhlmann et al., "Applicability of Industrial Robots for Machining and Repair Processes", Procedia CIRP, vol. 11, pp. 234-238, 2013.

Wang et al., "Recent Repair Technology for Aero-Engine Blades", Recent Patents on Engineering, Bentham Science Publishers, vol. 09, Issue: 02, pp. 132-141, Aug. 2015.

Burghardt et al., "Robot-Operated Inspection of Aircraft Engine Turbine Rotor Guide Vane Segment Geometry", vol. 02, pp. 345-348, Jan. 2017.

* cited by examiner

SERVICE APPARATUS FOR USE WITH ROTARY MACHINES

BACKGROUND

The field of the disclosure relates generally to service apparatus and, more particularly, to service apparatus for inspecting and/or repairing rotary machines.

At least some known rotary machines, such as turbines for aircraft engines and gas and steam powered turbines for industrial applications, include an outer case and at least one rotor that carries multiple stages of rotating airfoils, i.e., blades, which rotate with respect to the outer case. In addition, the outer case carries multiple stages of stationary airfoils, i.e., guide vanes. The blades and guide vanes are arranged in alternating stages. In at least some known rotary machines, shrouds are disposed on the radially inner surfaces of a stator to form a ring seal around tips of the blades. Together, the blades, guide vanes, and shrouds define a primary flowpath inside the compressor and turbine sections of the rotary machine. This flowpath, combined with a flowpath through the combustor, defines a primary cavity within the rotary machine.

During operation, the components of the rotary machine experience degradation which can be observed during inspections. Examples of conditions observed during inspections include wear (e.g., from incursion of blade tips into the shrouds, particle-induced erosion, water droplet induced erosion, wear due to sliding contact between stationary components), impact (e.g., spallation of thermal barrier coating (TBC) or environmental barrier coating (EBC) from turbine-section components, leading edge burring/bending of compressor blades), cracking (e.g., thermal fatigue, low-cycle fatigue, high-cycle fatigue, creep rupture), edge-of-contact damage between stationary parts, oxidation or hot corrosion of high-temperature metallic sections, static seal degradation, and creep deformation (e.g., of guide vane sidewalls/airfoils, blade platforms, and blade tip shrouds).

For service intervals, the rotary machines are sometimes at least partially disassembled to allow inspection, repair, and/or replacement of damaged components. For example, sometimes the rotor is removed from the rotary machine during the service intervals to provide access to the guide vanes, the outer case, the shrouds, and/or the rotor itself. However, cranes and/or other specialized apparatus are generally required to remove the rotors from the rotary machines and then to replace the rotors in the rotary machines. The cranes and specialized apparatus increase the cost of the service intervals. In addition, removing the rotors from the rotary machines increases the time required for the service intervals, and, thus, the time that the rotary machines are removed from service.

BRIEF DESCRIPTION

In one aspect, a service apparatus for use in maintaining a machine including a stator and a rotor is provided. The service apparatus includes a carriage assembly configured to couple to the rotor. The service apparatus is selectively transitionable between a stowed position in which the service apparatus is rotatable with the rotor and an extended position in which the service apparatus is extended toward the stator. The service apparatus also includes at least one maintenance device coupled to the carriage assembly. The at least one maintenance device is operable to perform a maintenance operation on a surface of the stator with the service apparatus in the extended position.

In another aspect, a system for maintaining a machine including a rotor and a stator is provided. The system includes a service apparatus including a carriage assembly configured to couple to the machine and a maintenance device coupled to the carriage assembly. The service apparatus is selectively transitionable between a stowed position and an extended position in which the service apparatus is extended toward the stator. The maintenance device is operable to perform a maintenance operation on a surface of the machine with the carriage assembly in the extended position. The system also includes a controller for the service apparatus. The controller is configured to selectively transition the service apparatus between the stowed position and the extended position.

In a further aspect, a method of operating a service apparatus for use with a machine including a rotor and a stator is provided. The method includes coupling the service apparatus to the rotor. The service apparatus includes a carriage assembly and a maintenance device. The service apparatus is selectively transitionable between a stowed position and an extended position. The method also includes positioning the service apparatus in the stowed position and rotating the rotor to a desired angular position with the service apparatus in the stowed position. The method further includes transitioning the service apparatus from the stowed position to the extended position with the rotor at the desired angular position. At least a portion of the service apparatus is extendable toward the stator in the extended position. The method also includes performing, using the maintenance device, a maintenance operation on a surface of the stator.

DRAWINGS

These and other features, aspects, and advantages of the present disclosure will become better understood when the following detailed description is read with reference to the accompanying drawings in which like characters represent like parts throughout the drawings, wherein.

Figure 1:
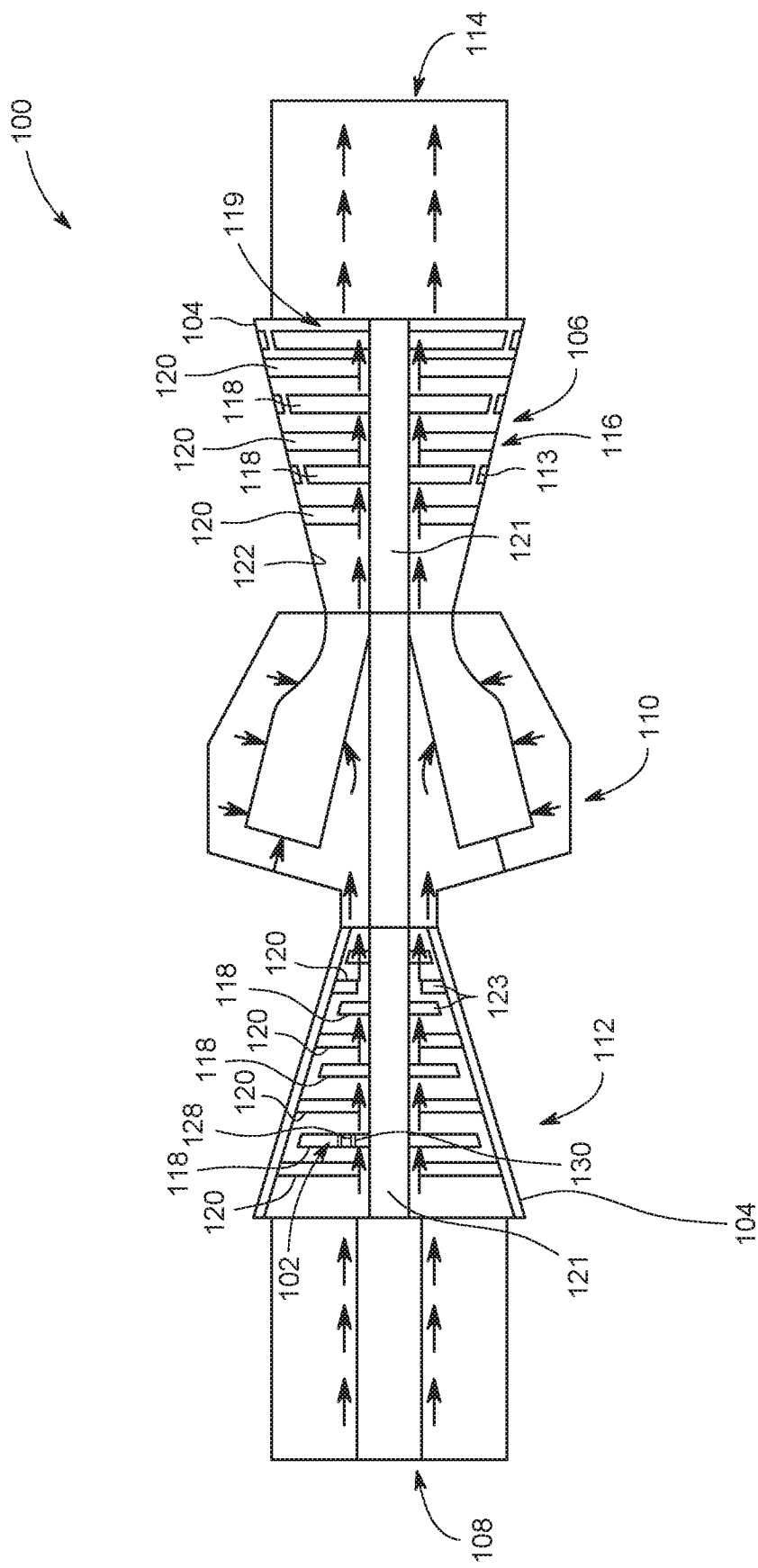
FIG. 1 is a cross-sectional schematic view of an exemplary rotary machine and an exemplary service apparatus.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, a keyboard, a remote motion capture system, and a wearable motion capture system. Alternatively, other computer peripherals may also be used that may include, for example, but not be limited to, a scanner. Furthermore, in the exemplary embodiment, additional output channels may include, but not be limited to, an operator interface monitor, a heads-up display, tactile output system, and/or an acoustic output system. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. As used herein, the term "motor" is not limited to electrically driven rotary motors, but broadly refers to any device that creates motion, including, for example and without limitation, electric motors, internal combustion engines, sterling cycle engines, pneumatic actuators, hydraulic actuators, shape memory alloys, and electroactive polymers. The above examples are exemplary only, and thus are not intended to limit in any way the definition and/or meaning of the term processor and processing device.

Embodiments described herein provide service apparatus for use in maintaining rotary machines including a turbine assembly. The service apparatus includes at least one maintenance device that facilitates repairing and/or inspecting the rotary machine. The service apparatus is configured to couple to the turbine assembly and is transitionable between a stowed position and an extended position. In the stowed position, the service apparatus allows a rotor to rotate to a desired angular position. In the extended position, the service apparatus extends beyond an edge of an airfoil of the rotor. In addition, the at least one maintenance device may be positioned to perform a maintenance operation on a surface of the turbine assembly with the service apparatus in the extended position. In some embodiments, a controller controls rotation of the rotor and positions the service apparatus between the stowed position and the extended position when the rotor is at desired angular positions. As a result, the service apparatus provides increased access to locations within the cavity of the rotary machine without requiring removal of the rotor and/or disassembly of the rotary machine and reduces the amount of time that the rotary machine is removed from service for maintenance.

FIG. 1 is a cross-sectional schematic view of an exemplary rotary machine and a service apparatus 102. In the exemplary embodiment, the rotary machine includes a turbine assembly 100. In alternative embodiments, the rotary machine includes any assembly. For example, in some embodiments, the rotary machine includes, without limitation, any of the following: a compressor, a blower, a pump, a turbine, a motor, and a generator.

In the exemplary embodiment, turbine assembly 100 includes an outer case 104, a turbine 106, an inlet 108, a combustor 110, a compressor 112, and an exhaust 114. Fluid flows from inlet 108, through compressor 112, through combustor 110, through turbine 106, and is discharged through exhaust 114. Together, outer case 104, blades 118, guide vanes 120, and shrouds 113 define a primary flowpath inside compressor 112 and turbine 106 of turbine assembly 100. This flowpath, combined with a flowpath through combustor 110, defines a primary cavity within turbine assembly 100. In alternative embodiments, turbine assembly 100 is configured in any manner that enables turbine assembly 100 to operate as described herein.

Also, in the exemplary embodiment, compressor 112 and turbine 106 include airfoils configured to direct fluid through turbine assembly 100. In particular, compressor 112 and turbine 106 include blades 118 and guide vanes 120. Blades 118 are operably coupled to a rotating shaft 121 such that blades 118 rotate when rotating shaft 121 rotates. Together, blades 118 and rotating shaft 121 form a rotor 119 of turbine assembly 100. Guide vanes 120 and shrouds 113 are stationary components and are coupled to an inner surface 122 of outer case 104. Accordingly, guide vanes 120, shrouds 113, and outer case 104 at least partially form a stator 116 of turbine assembly 100. Blades 118 and guide vanes 120 generally are positioned alternatingly along the rotor axis within turbine assembly 100. In alternative embodiments, compressor 112 and/or turbine 106 includes any airfoils that enable turbine assembly 100 to operate as described herein.

In addition, in the exemplary embodiment, service apparatus 102 is configured to couple to turbine assembly 100. Accordingly, service apparatus 102 facilitates maintenance of turbine assembly 100. For example, service apparatus 102 facilitates inspection and repair of turbine assembly 100 without requiring removal of rotor 119. Moreover, service apparatus 102 includes a maintenance device 128 that is positionable to facilitate service apparatus 102 inspecting and/or repairing surfaces of turbine assembly 100.

During operation, service apparatus 102 is coupled to any component of turbine assembly 100. For example, in some embodiments, service apparatus 102 is coupled to outer case 104, blades 118, rotating shaft 121, and/or guide vanes 120. In the exemplary embodiment, service apparatus 102 is sized and shaped to fit between blades 118. For example, service apparatus 102 has a height, length, and width in a stowed position 124 (shown in FIG. 3) that are less than a clearance required to fit between blades 118. In some embodiments, service apparatus 102 is sized to fit on blades 118 in different stages of turbine assembly 100. For example, service apparatus 102 is sized to fit on blades 118 having the smallest width and can fit on blades having a larger width. In the exemplary embodiment, service apparatus 102 couples to a front edge of blades 118 and does not necessarily extend entirely across blades 118. In some embodiments, service apparatus 102 has a length in a range of approximately 0.5 inches to approximately 12 inches. In alternative embodiments, service apparatus 102 is any size and shape that enables service apparatus 102 to operate as described herein.

During operation, service apparatus 102 is used to inspect and/or repair interior components of turbine assembly 100. For example, in some embodiments, service apparatus 102 is coupled to blades 118 and/or rotating shaft 121 and rotor 119 is rotated to position service apparatus 102 adjacent a portion of turbine assembly 100. In other embodiments, service apparatus 102 is coupled to a stationary component of turbine assembly 100 and rotor 119 is rotated relative to service apparatus 102 to position a portion of rotor 119 adjacent service apparatus 102. Service apparatus 102 is selectively transitionable between a stowed position which enables rotor 119 to rotate and an extended position which enables service apparatus 102 to perform a maintenance operation on interior surface 123 of turbine assembly 100. Interior surface 123 may be any surface within the primary cavity of turbine assembly 100. For example, in some embodiments, interior surface 123 includes, without limitation, surfaces of blades 118, guide vanes 120, shrouds 113, and combustor 110. In some embodiments, service apparatus 102 detects a characteristic of interior surface 123. For example, in some embodiments, service apparatus 102 is used to generate an image of interior surface 123 and the image data is examined to determine whether repairs are necessary. If repairs are necessary, service apparatus 102 can be used to repair interior surface 123. For example, in some embodiments, service apparatus 102 patches a damaged portion of interior surface 123.

Figure 2:
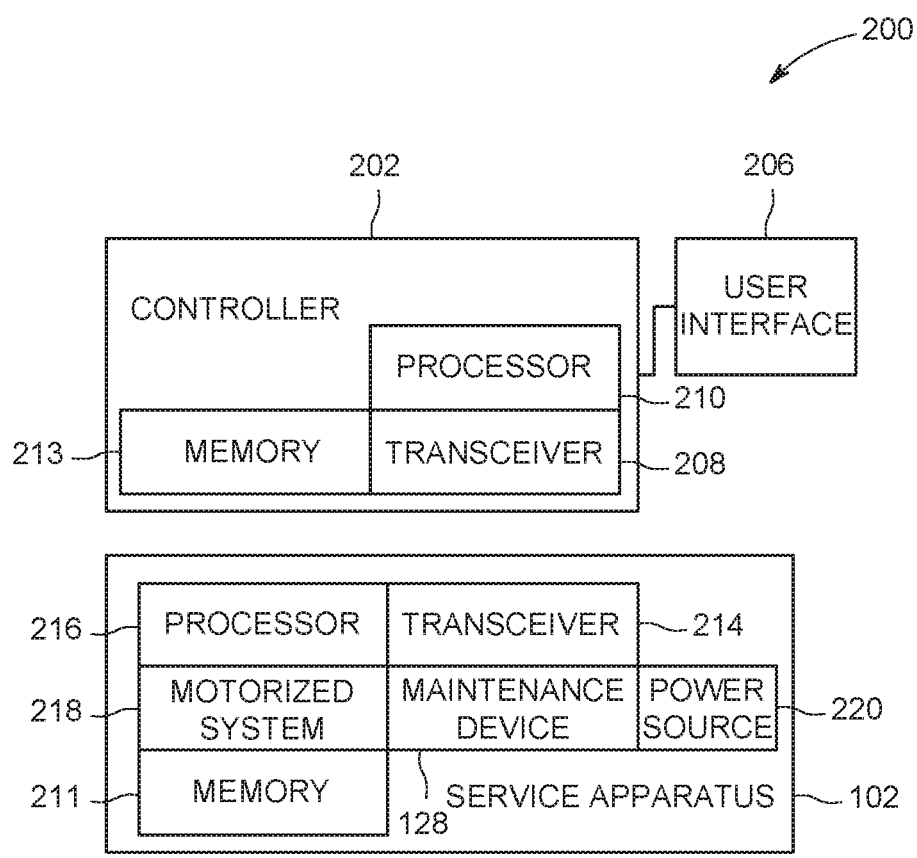
FIG. 2 is a schematic view of exemplary system for use in maintaining the rotary machine shown in FIG. 1.

FIG. 2 is a schematic view of an exemplary system 200 for use in maintaining turbine assembly 100 (shown in FIG. 1). System 200 includes service apparatus 102, a controller 202, and a user interface 206. Service apparatus 102 includes maintenance device 128 and motorized system 218. In alternative embodiments, system 200 includes any component that enables system 200 to operate as described herein. For example, in some embodiments, maintenance device 128 is omitted. In further embodiments, user interface 206 is omitted.

Also, in the exemplary embodiment, maintenance device 128 has freedom of movement in multiple directions when service apparatus is coupled to turbine assembly 100 (shown in FIG. 1). Motorized system 218 is coupled to maintenance device 128 and is configured to position maintenance device 128 relative to a carriage assembly 130 (shown in FIG. 3) of service apparatus 102. In particular, motorized system 218 moves maintenance device 128 relative to at least one axis of service apparatus 102. For example, in some embodiments, motorized system 218 pivots maintenance device 128 about an axis. In further embodiments, motorized system 218 moves maintenance device 128 in a direction parallel to or perpendicular to the axis. As a result, motorized system 218 facilitates positioning maintenance device 128 during operation of service apparatus 102. Motorized system 218 includes one or more motors and/or actuators that facilitate positioning maintenance device 128. In some embodiments, motorized system 218 exchanges signals with and is controlled by controller 202. In alternative embodiments, service apparatus 102 includes any motorized system 218 that enables service apparatus 102 to operate as described herein.

In addition, in the exemplary embodiment, controller 202 includes a transceiver 208, a processor 210, and a memory 213. In some embodiments, controller 202 is positioned remotely from service apparatus 102. Transceiver 208 is communicatively coupled with service apparatus 102 and is configured to send information to and receive information from a transceiver 214 of service apparatus 102. In the exemplary embodiment, transceiver 208 and transceiver 214 communicate wirelessly. In alternative embodiments, service apparatus 102 and controller 202 communicate in any manner that enables system 200 to operate as described herein. For example, in some embodiments, controller 202 and service apparatus 102 exchange information through a wired link extending between service apparatus 102 and controller 202.

In some embodiments, maintenance device 128 includes one or more sensors and/or repair tools. For example, in the exemplary embodiment, maintenance device 128 is configured to detect a characteristic of turbine assembly 100 (shown in FIG. 1) and/or service apparatus 102 and generate a signal relating to the characteristic. Transceiver 208 is in communication with maintenance device 128 and is configured to receive signals relating to the characteristic detected by maintenance device 128. In alternative embodiments, system 200 includes any maintenance device 128 that enables system 200 to operate as described herein, including but not limited to executing non-destructive evaluation, repair, and cleaning. For example, in some embodiments, maintenance device 128 of service apparatus 102 includes, without limitation, any of the following: an applicator, a drill, a grinder, a heater, a welding electrode, a dispenser, a laser, a combustion torch, a thermal spray gun, a brush, a grit blaster, a spray nozzle, an optical sensor (e.g., visible, infrared, multi-spectral, and/or depth sensor), a mechanical sensor (e.g., stylus profilometer, coordinate measurement probe, load transducer, linear variable differential transformer), a thermal sensor (e.g., pyrometer, thermocouple, resistance temperature detector), a chemical sensor, a magnetic sensor, an acoustic sensor (e.g., piezoelectric, microphone, ultrasound), and an electromagnetic sensor (e.g., eddy current, potential drop, x-ray). In some embodiments, service apparatus 102 is used to prepare interior surface 123 and a separate service apparatus (not shown) is used to repair interior surface 123, such as for a welding operation. In further embodiments, a separate service apparatus (not shown) is used to prepare interior surface 123 and service apparatus 102 is used to repair interior surface 123, such as for a welding operation.

In addition, in the exemplary embodiment, service apparatus 102 includes a processor 216 and a memory 211. Processor 216 is configured to execute instructions for controlling components of service apparatus 102, such as maintenance device 128 and motorized system 218. In alternative embodiments, service apparatus 102 includes any processor 216 that enables system 200 to operate as described herein. In some embodiments, processor 216 is omitted.

Also, in the exemplary embodiment, user interface 206 is configured to display information relating to the characteristics detected by maintenance device 128 for interpretation by the user. User interface 206 may be included on a remote computing device (not shown) and/or may be incorporated with controller 202. User interface 206 may include, among other possibilities, a web browser and/or a client application. For example, in some embodiments, user interface 206 displays images of interior surface 123 of turbine assembly 100 based on received signals. In some embodiments, user interface 206 allows a user to input and/or view information relating to control of service apparatus 102. In an exemplary embodiment, user interface 206 is configured to display information relating to the state of one or more of maintenance device 128 and a power source 220 for interpretation by the user. For example, state information may include the position of maintenance device 128 relative to carriage assembly 130 of service apparatus 102. State information may also include charge status of power source 220 and/or current draw on the various drive and positioning motors. Processor 210 translates user inputs into steering, tool motion, camera control, sensor control, sensor motion, and/or any other commands and sends information via transceiver 208 to service apparatus 102 via transceiver 214. In some embodiments, user control of service apparatus 102 is in real time, such as through a joystick, keyboard, touchscreen, a remote motion capture system, and a wearable motion capture system or other interface having similar function. In other embodiments, service apparatus 102 is controlled partially or wholly according to a pre-programmed routine. In further embodiments, service apparatus 102 is at least partially automated. In some embodiments, a user inputs information such as operation goals or conditional directions. In further embodiments, information, such as information received by controller 202 from service apparatus 102, control data sent to service apparatus 102, and additional user inputs or state information (e.g., location, time, orientation, datalink quality, battery levels, repair material levels, failure mode indicators), is logged into memory 211 and/or memory 213.

Figure 3:
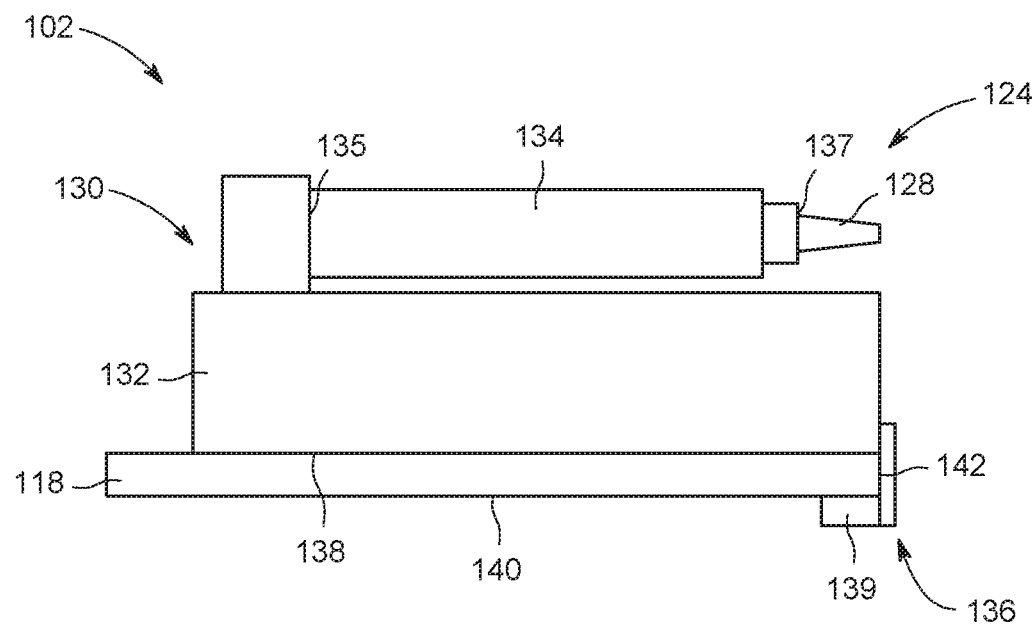
FIG. 3 is a schematic side view of the service apparatus shown in FIG. 1 in a stowed position.
Figure 4:
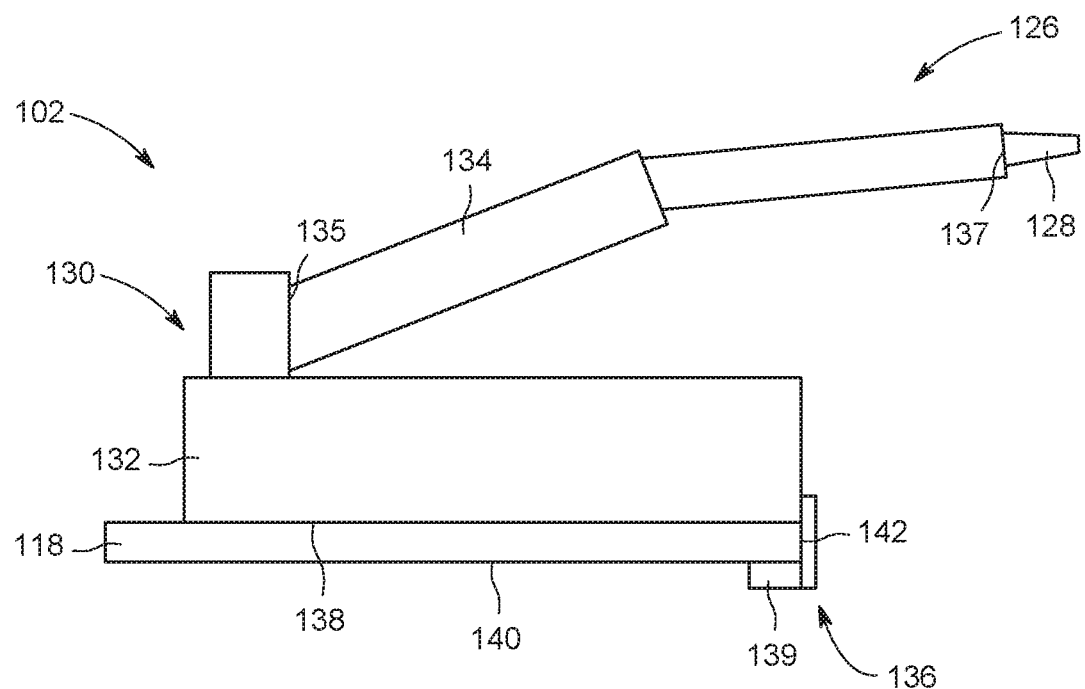
FIG. 4 is a schematic side view of the service apparatus shown in FIG. 1 in an extended position.

FIG. 3 is a schematic side view of service apparatus 102 in a first or stowed position 124. FIG. 4 is a schematic side view of service apparatus 102 in a second or extended position 126. Service apparatus 102 includes maintenance device 128 and a carriage assembly 130. Carriage assembly 130 includes a base 132, at least one arm 134, and an anchor mechanism 136. Arm 134 is coupled to base 132 at a first end 135 and supports maintenance device 128 at a second end 137. Arm 134 is positionable relative to base 132 to allow service apparatus 102 to transition between stowed position 124 and extended position 126, as described in detail herein. In some embodiments, arm 134 is pivotable and/or linearly translatable relative to base 132. In alternative embodiments, service apparatus 102 includes any carriage assembly 130 that enables service apparatus 102 to operate as described herein.

Also, in the exemplary embodiment, carriage assembly 130 is coupleable to a component of turbine assembly 100 (shown in FIG. 1) such as blade 118. Blade 118 includes a first surface 138, a second surface 140 opposite first surface 138, and an edge 142 extending between first surface 138 and second surface 140. Edge 142 extends along a perimeter of blade 118 and defines an outermost extent of blade 118. In some embodiments, first surface 138 and second surface 140 are pressure and suction surfaces of blade 118. Carriage assembly 130 is coupled to edge 142 of blade 118 by anchor mechanism 136. Base 132 of carriage assembly 130 extends along first surface 138 of blade 118 when carriage assembly 130 is coupled to blade 118. In the exemplary embodiment, anchor mechanism 136 includes a clamp 139 that extends over edge 142 and is tightened to secure carriage assembly 130 in position. In alternative embodiments, service apparatus 102 includes any anchor mechanism 136 that enables service apparatus 102 to operate as described herein. For example, in some embodiments, anchor mechanism 136 includes, without limitation, magnets, straps, compressible members, fasteners, and/or friction engagement devices.

Also, in the exemplary embodiment, service apparatus 102 fits within edges 142 of blade 118, i.e., service apparatus 102 does not extend beyond edges 142, when service apparatus 102 is in stowed position 124. Accordingly, stowed position 124 of service apparatus 102 allows blade 118 to rotate relative to stationary components of turbine assembly 100 (shown in FIG. 1) without service apparatus 102 interfering with the rotation. In stowed position 124, arm 134 is positioned alongside base 132 and within the footprint of base 132.

In addition, in the exemplary embodiment, service apparatus 102 extends beyond edges 142 of blade 118 when service apparatus 102 is in extended position 126. Specifically, arm 134 extends at least partially away from base 132 such that second end 137 and maintenance device 128 are spaced from base 132 when service apparatus 102 is in extended position 126. Accordingly, extended position 126 facilitates maintenance device 128 performing a maintenance operation on a surface 123 (shown in FIG. 1) of turbine assembly 100. In alternative embodiments, service apparatus 102 has any position that enables service apparatus 102 to operate as described herein.

In reference to FIGS. 1-4, a method of operating service apparatus 102 for use with turbine assembly 100 includes coupling service apparatus 102 to turbine assembly 100 and positioning service apparatus 102 in stowed position 124. Specifically, in the exemplary embodiment, base 132 of carriage assembly 130 is coupled to blades 118 of turbine assembly 100 by anchor mechanism 136. In some embodiments, service apparatus 102 is coupled to any blades 118 and/or rotating shaft 121 of turbine assembly 100. In further embodiments, service apparatus 102 is coupled to a stationary portion of turbine assembly 100. In some embodiments, a portion of outer case 104 is removed from turbine assembly 100 to enable service apparatus 102 to be coupled to turbine assembly 100. In alternative embodiments, service apparatus 102 is coupled to turbine assembly 100 in any manner that enables service apparatus 102 to operate as described herein.

In addition, in the exemplary embodiment, the method includes rotating rotor 119 of turbine assembly 100 with carriage assembly 130 in stowed position 124. In some embodiments, controller 202 is configured to rotate rotor 119 and to stop rotor 119 when rotor 119 reaches desired angular positions. At the desired angular position(s), service apparatus 102 is positioned to perform a maintenance operation on a portion of turbine assembly 100 such as blades 118 and/or vanes 120. In some embodiments, a motor (not shown) is used to rotate rotor 119. In alternative embodiments, rotor 119 is positioned in any manner that enables turbine assembly 100 to operate as described herein.

In some embodiments, rotor 119 is rotated continuously and carriage assembly 130 is moved between stowed position 124 and extended position 126 while rotor 119 is rotated. For example, in some embodiments, as rotor 119 is rotated, carriage assembly 130 is moved to extended position 126 between guide vanes 120 and carriage assembly 130 is moved to stowed position 124 as carriage assembly 130 passes guide vanes 120. Accordingly, a maintenance operation may be performed on a portion of turbine assembly 100 such as guide vanes 120 while rotor 119 is rotated. For example, in some embodiments, service apparatus 102 is used to profile edges of at least some of guide vanes 120 as rotor 119 is rotated. In further embodiments, service apparatus 102 is rotatable with rotor 119 when carriage assembly 130 is in the extend position and coupled to rotor 119. Accordingly, carriage assembly 130 may be maintained in extended position 126 as carriage assembly 130 passes at least some guide vanes 120 such that service apparatus 102 is configured to interact with guide vanes 120 of turbine assembly 100 as rotor 119 rotates. For example, in some embodiments, service apparatus 102 may be used to treat, e.g., abrade, at least some guide vanes 120.

Also, in the exemplary embodiment, the method includes positioning service apparatus 102 between stowed position 124 and extended position 126 when rotor 119 is at the desired angular position. For example, service apparatus 102 is moved to extended position 126 and maintenance device 128 is positioned adjacent interior surface 123 of turbine assembly 100 when rotor 119 is at a desired angular position. In some embodiments, for example, service apparatus 102 extends from one stage in compressor 112 to blades 118 and/or vanes 120 in another stage when service apparatus 102 is in extended position 126. Service apparatus 102 performs one or more maintenance operations for surface 123 of turbine assembly 100 using maintenance device 128 with service apparatus 102 in extended position 126. In some embodiments, when the maintenance operation(s) is/are completed, service apparatus 102 is moved to stowed position 124 and rotor 119 is rotated. In some embodiments, a second service apparatus (not shown) is used to perform some repairs such as welding operations. When inspections and/or repairs are completed, service apparatus 102 is removed from turbine assembly 100 and turbine assembly 100 is reassembled, e.g., outer case 104 is positioned over at least a portion of turbine assembly 100. The time required to assemble and return turbine assembly 100 to service is reduced because rotor 119 of turbine assembly 100 was not required to be removed during the service interval. In addition, in some embodiments, turbine assembly 100 is inspected and/or repaired using service apparatus 102 without disassembly of turbine assembly 100. For example, service apparatus 102 is positioned within a primary cavity of turbine assembly 100 using an opening in turbine assembly 100.

Figure 5:
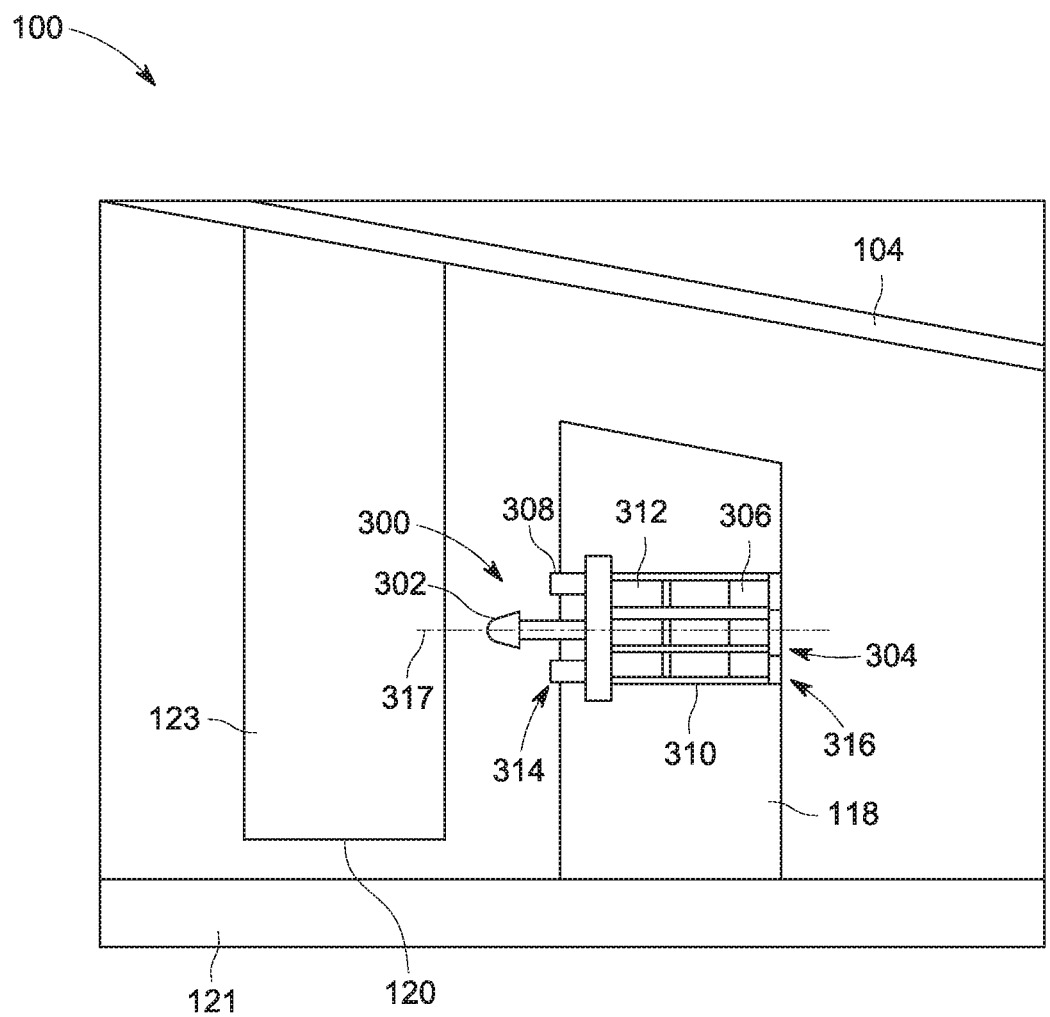
FIG. 5 is a perspective view of an alternative embodiment of a service apparatus for use with the rotary machine shown in FIG. 1.
Figure 6:
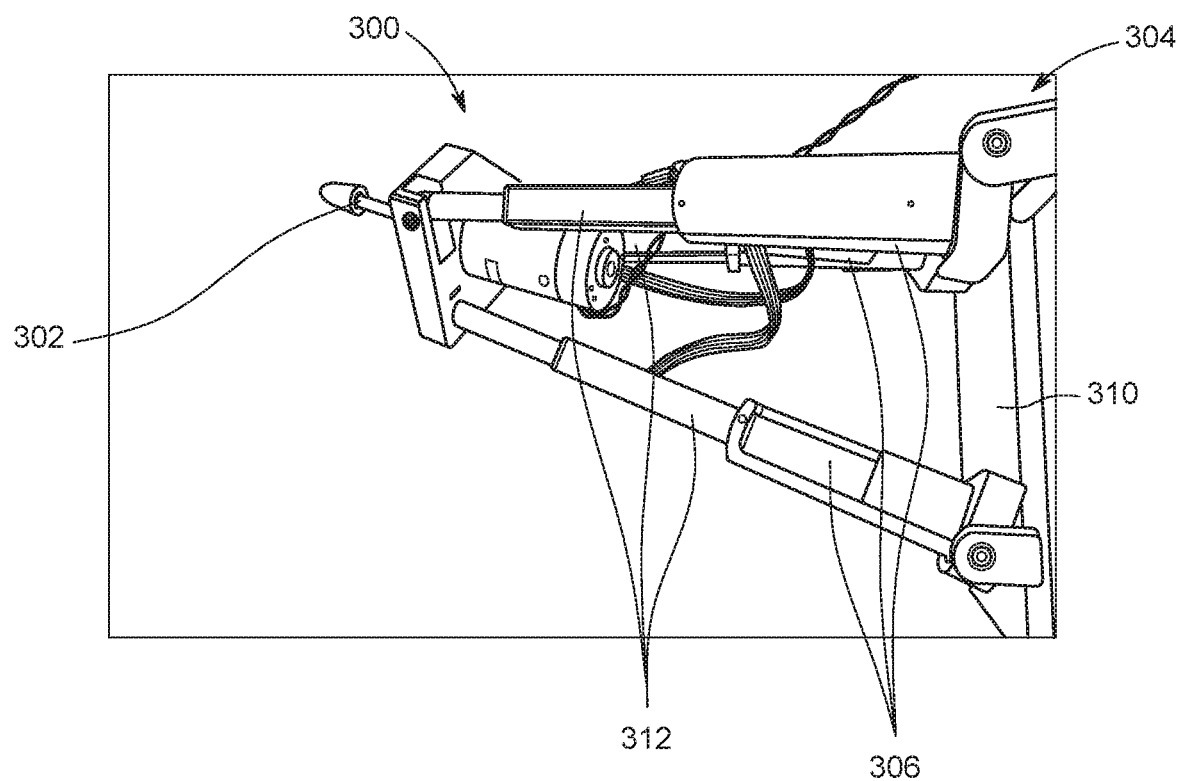
FIG. 6 is a perspective view of a portion of the service apparatus shown in FIG. 5 in an extended position.

FIG. 5 is a perspective view of an alternative embodiment of a service apparatus 300 for use with turbine assembly 100. FIG. 6 is a perspective view of a portion of the service apparatus 300 in an extended position. Service apparatus 300 includes at least one maintenance device 302, a carriage assembly 304, at least one actuator 306, and an anchor mechanism 308. In alternative embodiments, service apparatus 300 includes any component that enables service apparatus 300 to operate as described herein.

Also, in the exemplary embodiment, service apparatus 300 is configured to couple to blades 118 of turbine assembly 100. Specifically, service apparatus 300 is positioned between adjacent blades 118 and anchor mechanism 308 is coupled to at least one of blades 118. Service apparatus 300 is sized to fit between blades 118 when service apparatus 300 is in the stowed position. In some embodiments, rotation of rotating shaft 121 is used to bring service apparatus 300 into proximity of the target turbine components of turbine assembly 100 to inspect and/or repair. In alternative embodiments, service apparatus 300 is positioned relative to turbine assembly 100 in any manner that enables service apparatus 300 to operate as described herein. For example, in some embodiments, portions of service apparatus 300 are positioned between multiple pairs of blades 118 and/or along rotating shaft 121 (shown in FIG. 1). In further embodiments, service apparatus 300 is coupled to stationary components of turbine assembly 100.

Moreover, in the exemplary embodiment, carriage assembly 304 includes a base 310 and a plurality of arms 312. Base 310 extends between a front end 314 and a rear end 316 of service apparatus 300. Rear end 316 is positioned adjacent an edge of blade 118 when service apparatus 102 is coupled to blade 118. Base 310 is elongated along a longitudinal axis 317 of service apparatus 300. In addition, base 310 is generally rectangular in shape. Arms 312 include a plurality of shafts. Actuators 306 are coupled to arms 312 and position arms 312 relative to base 310. In alternative embodiments, service apparatus 300 includes any carriage assembly 304 that enables service apparatus 300 to operate as described herein.

Also, in the exemplary embodiment, carriage assembly 304 is coupled to and supports maintenance device 302. Specifically, maintenance device 128 is coupled to ends of arms 312. Accordingly, actuators 306 are configured to move maintenance device 302 with arms 312 relative to base 310. Maintenance device 302 is configured to inspect and/or repair one or more surfaces of turbine assembly 100.

In addition, in the exemplary embodiment, maintenance device 302 is configured to repair a surface of turbine assembly 100. For example, service apparatus 300 is positioned in general proximity of the region of turbine assembly 100 requiring repair. Service apparatus 300 is moved between the stowed position and the extended position and maintenance device 302 is positioned adjacent the interior surface of turbine assembly 100 that needs repair. In some embodiments, the region within turbine assembly 100 requiring repair includes, without limitation, any of the following: cracks, coating loss, surface foulant accumulation, worn surfaces, and/or any other deterioration. For example, in some embodiments, repair material is applied onto the interior surface of turbine assembly 100 in order to repair such region.

Figure 7:
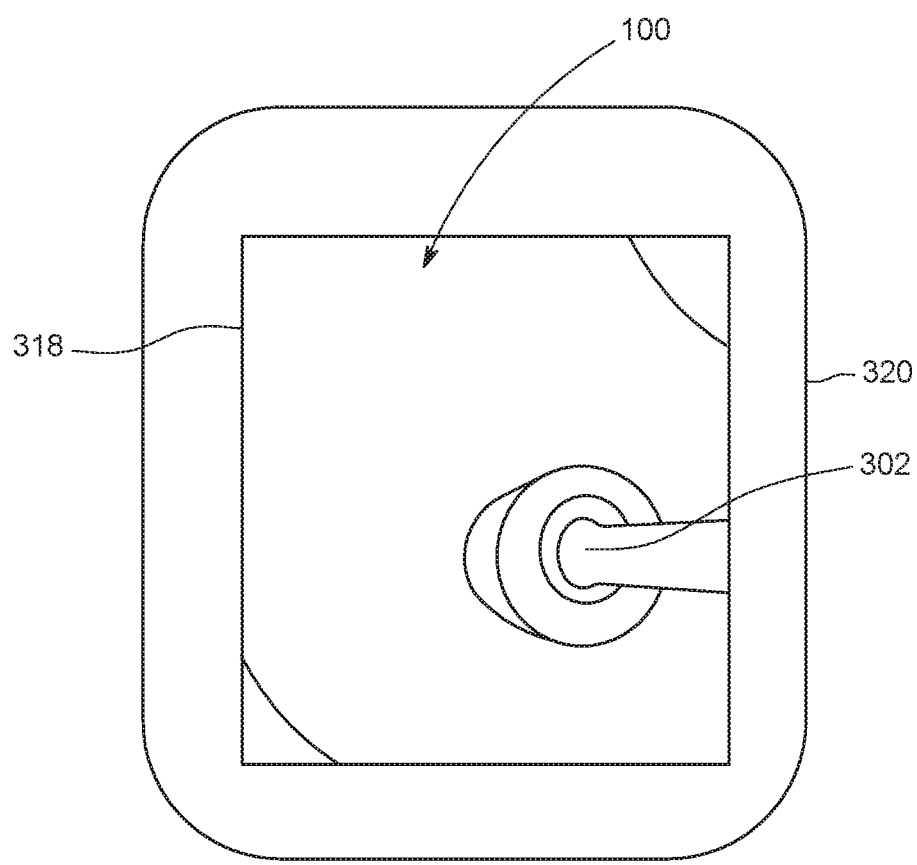
FIG. 7 is an image of the rotary machine shown in FIGS. 1, 5, and 6, from a point of view of a maintenance device of the service apparatus shown in FIGS. 5 and 6.

FIG. 7 is an image 318 of turbine assembly 100 from a point of view of maintenance device 302 of service apparatus 300. In some embodiments, image 318 is displayed on a user interface 320 and is generated based on information captured by maintenance device 302. Accordingly, in some embodiments, service apparatus includes a first maintenance device (not shown in FIG. 7), e.g., a sensor, configured to acquire data and provide information about turbine assembly 100 and a second maintenance device 302, e.g., a repair tool, configured to perform a repair operation. To provide information from the point of view of second maintenance device 302, the first maintenance device is coupled to carriage assembly 304 adjacent to and aligned with second maintenance device 302. In further embodiments, the first maintenance device is coupled to or integrated with second maintenance device 302. As a result, service apparatus 300 is capable of performing inspection and repair of turbine assembly 100 and multiple apparatus are not required. In alternative embodiments, service apparatus 300 includes any maintenance device 302 that enables service apparatus 300 to operate as described herein.

Also, in the exemplary embodiment, image 318 allows an operator to view, in real time, turbine assembly 100 as service apparatus 300 performs a maintenance operation. In addition, image 318 facilitates an operator and/or controller 202 (shown in FIG. 2) positioning service apparatus 300 and maintenance device 302 relative to turbine assembly 100. Moreover, mapping of turbine assembly 100 and/or separate sensors may not be required because service apparatus 300 directly provides information on turbine assembly 100. As a result, service apparatus 300 reduces the time required for maintenance operations and increases the accuracy of data collection about turbine assembly 100. In addition, service apparatus 300 may facilitate autonomous inspection and/or repair operations.

The above described embodiments provide service apparatus for use in maintaining rotary machines including a turbine assembly. The service apparatus includes at least one maintenance device that facilitates repairing and/or inspecting the rotary machine. The service apparatus is configured to couple to the turbine assembly and is transitionable between a stowed position and an extended position. In the stowed position, the service apparatus allows a rotor to rotate to a desired angular position. In the extended position, the service apparatus extends beyond an edge of an airfoil of the rotor. In addition, the at least one maintenance device may be positioned to perform a maintenance operation on a surface of the turbine assembly with the service apparatus in the extended position. In some embodiments, a controller controls rotation of the rotor and positions the service apparatus between the stowed position and the extended position when the rotor is at desired angular positions. As a result, the service apparatus provides increased access to locations within the cavity of the rotary machine without requiring removal of the rotor and/or disassembly of the rotary machine and reduces the amount of time that the rotary machine is removed from service for maintenance.

An exemplary technical effect of the methods, systems, and apparatus described herein includes at least one of: (a) reducing the time to inspect and/or repair rotary machines; (b) increasing the accessibility of difficult-to-reach locations within a turbine assembly for inspection and/or in situ repair; (c) reducing the time that rotary machines are out of service for maintenance; (d) increasing the precision and/or reliability of inspection and repair of rotary machines; (e) enabling the extension of planned service outages of a rotary machine for inspection and/or repair; (0 enhancing data capture for use in quantifying and/or modeling the service condition of at least some components of the rotary machine; and (g) enabling inspection and/or repair without disassembly of the rotary machine.

Exemplary embodiments of methods, systems, and apparatus for use in maintaining rotary machines are not limited to the specific embodiments described herein, but rather, components of systems and/or steps of the methods may be utilized independently and separately from other components and/or steps described herein. For example, the methods, systems, and apparatus may also be used in combination with other systems requiring inspection and/or repair of components, and are not limited to practice with only the systems and methods as described herein. Rather, the exemplary embodiment can be implemented and utilized in connection with many other applications, equipment, and systems that may benefit from using a service apparatus for inspection and/or repair.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A service apparatus for use in maintaining a machine including a stator and a rotor, the rotor having a shaft defining a longitudinal axis and wherein a radial axis extends in a direction perpendicular to the longitudinal axis, said service apparatus comprising:
    a carriage assembly configured to couple to the rotor, wherein said service apparatus is selectively transitionable between a stowed position in which said service apparatus is rotatable with the rotor and an extended position in which said service apparatus is extended toward the stator; and
    at least one maintenance device coupled to said carriage assembly, wherein said at least one maintenance device is operable to perform a maintenance operation on a surface of the stator with said service apparatus in the extended position, wherein said rotor includes a first rotor airfoil and a second rotor airfoil and wherein the stator includes a first stator airfoil, wherein said carriage assembly includes a base and a plurality of arms configured to support said at least one maintenance device, and wherein each of the plurality of arms extend partially away from said base in the extended position, each of the plurality of arms actuated by a separate actuator, and each of the plurality of arms being coupled to the at least one maintenance device and cooperating to move the at least one maintenance device using each separate actuator;
    wherein in the stowed position the plurality of arms supporting the at least one maintenance device each have a first length, and wherein in the extended position the plurality of arms supporting the at least one maintenance device each have a second length, and wherein the second length is different than the first length;
    wherein the base of the carriage assembly is coupled to at least one of the first rotor airfoil and the second rotor airfoil;
    wherein the plurality of arms are positioned along the base and within a footprint of the base in the stowed position.

2. The service apparatus in accordance with claim 1, wherein the machine is a turbine assembly including a compressor section including the stator and the rotor extending through the compressor section.

3. The service apparatus in accordance with claim 1, wherein said at least one maintenance device comprises at least one of the following: an applicator, a dispenser, a drill, a grinder, a heater, a laser, a welding electrode, a combustion torch, a thermal spray gun, a brush, a grit blaster, and a spray nozzle.

4. The service apparatus in accordance with claim 1, wherein the base of the carriage assembly is secured to the first rotor airfoil using a clamp.

5. The service apparatus of claim 1, wherein the base of the carriage assembly is coupled to the first rotor airfoil across an entire width of the first rotor airfoil.

6. The service apparatus of claim 1, wherein in the extended position, the plurality of arms extend in an extended direction generally parallel to the longitudinal axis.

7. The service apparatus in accordance with claim 1, wherein the machine is a turbine assembly including the stator and the rotor extending through the stator, the rotor including the shaft and a plurality of airfoils including the first rotor airfoil and the second rotor airfoil coupled to the shaft.

8. The service apparatus in accordance with claim 7, wherein said carriage assembly is sized to fit between adjacent airfoils of said plurality of airfoils of said rotor.

9. The service apparatus in accordance with claim 1, wherein said at least one maintenance device comprises at least one sensor selected from the following: an optical sensor, a mechanical sensor, a thermal sensor, a chemical sensor, a magnetic sensor, an acoustic sensor, and an electromagnetic sensor.

10. The service apparatus in accordance with claim 9, further comprising a user interface, wherein said user interface allows an operator to control said at least one maintenance device based on data acquired by said at least one sensor.

11. The service apparatus of claim 10, wherein said user interface is configured to allow the operator to position said at least one maintenance device relative to the stator.

12. The service apparatus of claim 10, wherein said user interface is configured to send operational commands to said at least one maintenance device.

13. The service apparatus of claim 10, wherein said at least one sensor is a camera, and wherein said user interface is configured to display images of at least one of the machine and said at least one maintenance device.

14. A system for maintaining a machine including a rotor and a stator, the rotor having a shaft defining a longitudinal axis and wherein a radial axis extends in a direction perpendicular to the longitudinal axis, said system comprising:
   a service apparatus comprising:
   a carriage assembly configured to couple to the rotor, wherein said service apparatus is selectively transitionable between a stowed position and an extended position in which the service apparatus is extended toward the stator;
   a maintenance device coupled to said carriage assembly, wherein said maintenance device is operable to perform a maintenance operation on a surface of the machine with said carriage assembly in the extended position and wherein said rotor includes a first rotor airfoil and a second rotor airfoil and the stator includes a first stator airfoil, wherein said carriage assembly includes a base and a plurality of arms configured to support said maintenance device, and wherein each of the plurality of arms extend partially away from said base in the extended position, each of the plurality of arms actuated by a separate actuator, and each of the plurality of arms being coupled to the maintenance device and cooperating to move the maintenance device using each separate actuator; and
   a controller for said service apparatus, wherein said controller is configured to selectively transition said service apparatus between the stowed position and the extended position;
   wherein in the stowed position the plurality of arms supporting the maintenance device each have a first length, and wherein in the extended position the plurality of arms supporting the maintenance device each have a second length, and wherein the second length is different than the first length;
   wherein the base of the carriage assembly is coupled to at least one of the first rotor airfoil and the second rotor airfoil;
   wherein the plurality of arms are positioned along the base and within a footprint of the base in the stowed position.

15. The system in accordance with claim 14, wherein said controller is configured to rotate the rotor with said carriage assembly in the stowed position, configured to stop the rotor with the rotor at a desired angular position, and configured to move said carriage assembly to the extended position with the rotor at the desired angular position.

16. The system in accordance with claim 14, further comprising a user interface configured to display an image of the machine based on data acquired by said maintenance device, wherein said maintenance device comprises a camera, and wherein the image is from the point of view of said maintenance device.

17. The system in accordance with claim 14, wherein the base of the carriage assembly is secured to the first rotor airfoil using a clamp.

18. A method of operating a service apparatus for use with a machine including a rotor and a stator, the rotor having a shaft defining a longitudinal axis and wherein a radial axis extends in a direction perpendicular to the longitudinal axis, said method comprising:
   coupling the service apparatus to the rotor, the service apparatus including a carriage assembly and a maintenance device, wherein the service apparatus is selectively transitionable between a stowed position and an extended position, and wherein said rotor includes a first rotor airfoil and a second rotor airfoil and the stator includes a first stator airfoil, wherein said carriage assembly includes a base and a plurality of arms configured to support the maintenance device, and wherein each of the plurality of arms extend partially away from said base in the extended position, each of the plurality of arms actuated by a separate actuator, and each of the plurality of arms being coupled to the maintenance device and cooperating to move the maintenance device using each separate actuator;
   positioning the service apparatus in the stowed position;
   rotating the rotor to a desired angular position with the service apparatus in the stowed position;
   transitioning the service apparatus from the stowed position to the extended position with the rotor at the desired angular position, wherein at least a portion of the service apparatus is extendable to interact with the first stator airfoil of the stator in the extended position;
   wherein in the stowed position the plurality of arms supporting the maintenance device each have a first length, and wherein in the extended position the plurality of arms supporting the maintenance device each have a second length, and wherein the second length is different than the first length;

wherein the base of the carriage assembly is coupled to at least one of the first rotor airfoil and the second rotor airfoil;

wherein the plurality of arms are positioned along the base and within a footprint of the base in the stowed position; and performing, using the maintenance device, a maintenance operation on a surface of the first stator airfoil of the stator.

19. The method in accordance with claim 18, further comprising displaying on a user interface an image of the stator from a point of view of the maintenance device.

20. The method in accordance with claim 18, further comprising moving the maintenance device relative to the base of the carriage assembly.

* * * * *